US012223002B2

(12) United States Patent
Badjatiya et al.

(10) Patent No.: US 12,223,002 B2
(45) Date of Patent: Feb. 11, 2025

(54) SEMANTICS-AWARE HYBRID ENCODER FOR IMPROVED RELATED CONVERSATIONS

(71) Applicant: ADOBE INC., San Jose, CA (US)

(72) Inventors: Pinkesh Badjatiya, Madhya Pradesh (IN); Tanay Anand, Bangalore (IN); Simra Shahid, Uttar Pradesh (IN); Nikaash Puri, New Delhi (IN); Milan Aggarwal, Delhi (IN); S Sejal Naidu, Madhya Pradesh (IN); Sharat Chandra Racha, Telangana (IN)

(73) Assignee: ADOBE INC., San Jose, CA (US)

( * ) Notice: Subject to any disclaimer, the term of this patent is extended or adjusted under 35 U.S.C. 154(b) by 138 days.

(21) Appl. No.: 17/454,445

(22) Filed: Nov. 10, 2021

(65) Prior Publication Data
US 2023/0143777 A1     May 11, 2023

(51) Int. Cl.
*G06F 16/9536*     (2019.01)
*G06F 16/9538*     (2019.01)
*G06F 40/20*     (2020.01)

(52) U.S. Cl.
CPC ...... *G06F 16/9536* (2019.01); *G06F 16/9538* (2019.01); *G06F 40/20* (2020.01)

(58) Field of Classification Search
CPC ... G06F 16/9536; G06F 16/9538; G06F 40/20
See application file for complete search history.

(56) References Cited

U.S. PATENT DOCUMENTS

| 2011/0270830 A1* | 11/2011 | Stefik | G06F 16/353 |
| | | | 707/731 |
| 2013/0046771 A1* | 2/2013 | Moitra | G06F 16/951 |
| | | | 707/E17.084 |

(Continued)

OTHER PUBLICATIONS

Jeffery Pennington, et al., "Glove: Global Vectors for Word Representation," Proceedings of the 2014 Conference on Empirical Methods in Natural Language Processing (EMNLP), pp. 1532-1543, Oct. 25-29, 2014.

(Continued)

*Primary Examiner* — Albert M Phillips, III
*Assistant Examiner* — Fernando M Mari Valcarcel
(74) *Attorney, Agent, or Firm* — F. CHAU & ASSOCIATES, LLC (57) ABSTRACT

A method of finding online relevant conversing posts, comprises receiving, by a web server serving an online forum, a query post from an inquirer using the online forum, computing a contextual similarity score between each conversing post of a set of conversing posts with a query post, wherein the contextual similarity score is computed between the body of each of conversing posts and of the query post, wherein N1 conversing posts with a highest contextual similarity score are selected; computing a fine grained similarity score between the subject of the query post and of each of the $N_1$ conversing posts, wherein N2 conversing posts with a highest fine grained similarity score are selected; and boosting the fine grained similarity score of the N2 conversing posts based on relevance metrics, wherein N3 highest ranked conversing posts are selected as a list of conversing posts most relevant to the query post.

16 Claims, 7 Drawing Sheets

(56) References Cited

U.S. PATENT DOCUMENTS

| | | | | |
|---|---|---|---|---|
| 2014/0019118 | A1* | 1/2014 | Tromp | G06F 40/253 |
| | | | | 704/9 |
| 2016/0140643 | A1* | 5/2016 | Nice | G06F 16/3344 |
| | | | | 705/26.7 |
| 2017/0068906 | A1* | 3/2017 | Korycki | G06N 20/00 |
| 2018/0260416 | A1* | 9/2018 | Elkaim | G06F 17/16 |
| 2020/0097544 | A1* | 3/2020 | Alexander | G06N 3/045 |
| 2020/0334486 | A1* | 10/2020 | Joseph | G06T 5/20 |
| 2021/0173857 | A1* | 6/2021 | Fume | G06F 16/337 |
| 2021/0182287 | A1* | 6/2021 | Agarwal | G06Q 30/0631 |
| 2021/0232613 | A1* | 7/2021 | Raval Contractor | G06N 5/02 |
| 2021/0342785 | A1* | 11/2021 | Mann | G06F 40/186 |

OTHER PUBLICATIONS

Wee Chung Gan, et al., "Improving the Robustness of Question Answering Systems to Question Paraphrasing," Proceedings of the 57th Annual Meeting of the Association for Computational Linguistics, pp. 6065-6075 Florence, Italy, Jul. 28-Aug. 2, 2019.

Ron Kohavi, et al., "Online Controlled Experiments and A/B Testing," Encyclopedia of Machine Learning and Data Mining, DOI 10.1007/978-1-4899-7502-7 891-1.

Jacob Devlin, et al., "BERT: Pre-Training of Deep Bidirectional Transformers for Language Understanding," Proceedings of the 2019 Conference of the North American Chapter of the Association for Computational Linguistics: Human Language Technologies. vol. 1 (Long and Short Papers), pp. 4171-4186.

Juan Ramos, "Using TF-IDF to Determine Word Relevance in Document Queries." In Proceedings of the first instructional conference on machine learning (vol. 242, No. 1, pp. 29-48).

Alexis Conneau, et al., "Unsuper Vised Cross-Lingual Representation Learning at Scale," Proceedings of the 58th Annual Meeting of the Association for Computational Linguistics, pp. 8440-8451.

Andrei Z. Broder, "On the Resemblance and Containment of Documents," In Proceedings, Compression and Complexity of Sequences 1997 (Cat. No. 97TB100171) (pp. 21-29). IEEE.

David M. Blei, et al., "Latent Dirichlet Allocation," The Journal of machine Learning research 3 (2003): 993-1022.

Tomas Mikolov et al., "Efficient Estimation of Word Representations in Vector Space," arXiv preprint arXiv:1301.3781 (2013).

Sakata, et al., "Faq Retrieval Using Query-Question Similarity and Bert-Based Query-Answer Relevance," In Proceedings of the 42nd International ACM SIGIR Conference on Research and Development in Information Retrieval (pp. 1113-1116).

* cited by examiner

Human evaluation

| Models | Better than OOTB | Equally good | Worse than OOTB | Both are not good | Inconclusive |
|---|---|---|---|---|---|
| Out of the Box (OOTB) | Current model deployed on the Community website. | | | | |
| Word2Vec | Preliminary analysis from the Communities team showed these models perform very bad as compared to OOTB model. | | | | |
| LDA Topic Modelling | | | | | |
| MinHash (subject + body) | | | | | |
| XLM (only subject) | 20.78% (16) | 36.36% (28) | 29.87% (23) | 5.19% (4) | 2.60% (2) |
| TFIDF(subject + body) | 22.22% (6) | 51.85% (14) | 22.22% (6) | 0.00% (0) | 3.70% (1) |
| BERT + Finetuned on Question Similarity (only subject) | 70% (7) | 20% (2) | 10% (1) | 0.00% (0) | 0.00% (0) |
| BERT + Finetuned on Paraphrasing (only subject) | 40% (4) | 20% (2) | 40% (4) | 0.00% (0) | 0.00% (0) |
| Model (subject + body) | 42.86% (33) | 48.05% (37) | 6.49% (5) | 2.60% (2) | 0.00% (0) |

Result Format → % of posts (No. of Posts)

FIG. 2

Related Conversation Test Results - Preliminary results

| | KPIs | Test | Control | % Lift, Challenger |
|---|---|---|---|---|
| | Visits | 482,641 | 332,467 | NA |
| | Unique visitors | 353,716 | 233,330 | NA |
| | Click through Rate (% CTR) | 1.56% | 1.46% | +6.8% |
| JCR | Visit-level JCR | 0.36% | 0.45% | -20.2% |
| Customer Effort | Time spent/visit (entire session, min) | 07:46 | 09:22 | -1min 36 sec |
| | Page Views/Visit (entire session) | 3.51 | 4.32 | -0.81 page views |

FIG. 3

All my scans have disappeared

I cannot find any of my scans. I have tried different logins, gone to the cloud but it keeps telling me there are no scans available. I have spent hous upon hours scanning docs and they are all gone. I am devasted. What else can I try.

[ Post ]

Related conversations
- scanning multiple pages   Acrobat
  0 likes 22 replies Acrobat
- Scanned pdf blank on Reader Touch
  1 likes 7 replies  Acrobat Reader
- Scan to sub folder
  0 likes 3 replies   Adobe Scan
- scanning canceled
  0 likes 2 replies  Acrobat
- Scan mobile app will not upload documents to Cloud
  1 like  3 replies   Scan
  scan
  0 likes 0 replies  Scan Related conversations
*Updated Sep 13, 2020 • Scan*
⊙ All my scans saved in Scan have disappeared
I had a lot of scans taken and saved in Scan but today when I went to Scan all my previo......
*Updated Jan 14, 2020 • Scan*
⊙ All my scans (ones that I have saved) have disappeared and they aren't in acrobat
I recently switched phones and have been working on a project and have approximately 800 scanned doc......
*Updated Oct 22, 2020 • Scan*
⊙ How to collect scans in a single folder? Adobe Scan
Come raccogliere scansion per fare una cartella unica

① 2  3  4

Related conversations
*Updated Feb 21, 2018 • Adobe Scan*
⊙ New Adobe Scan - Uploads all to Cloud
I switched iPhones and I always had saved my adobe scans. I had over 75 documents in there includin......
*Updated May 14, 2020 • Scan*
⊙ Privacy policy regarding Scan?
Since Scan saves all PDF versions of scans in the in the Cloud, can somebody please expl......
*Updated Jan 14, 2018 • Scan*
⊙ Lost most recent scans
Scanned in a bunch of old school notes and on my last batch program crashed. All recent scans lost. ......

1 ② 3  4

Related conversations
*Updated Jan 18, 2018 • Scan*
⊙ Where are the scans stored?
I have installed and used Scan but can't for the life of me find the scans, where are they sto......
*Updated Dec 14, 2018 • Scan*
⊙ How to reduce size of mobile scans?
Hi, I would like to scan documents for my business (finance-stuff) but the size of my scans is alway......
*Updated Nov 14, 2018 • Scan*
⊙ Help - All my CS6 programs are gone!!! I have Suite 6. As well as Premiere PRO and Lightroom. I have not used them in mont......

"The document could not be saved. There was a problem reading this document (110)" HELP!

I have spent HOURS of work on my PDF, it's 13.5 MB. It's a textbook I highlighted and studied, and cannot save. I get the error above. PLEASE help! If I save as it does not work.

[Post]

Related conversations
- ⊙ The document could not be saved. There was a problem reading this document (105)
  0 likes  4 replies  Acrobat
- ⊙ "Could not save the document" problem
  1 like  50 replies  XD
- ⊙ The document could not be saved. There was a problem reading this document (114).
  0 likes  3 replies  Acrobat
- ⊙ Reading Untagged Document with Assistive Technology
  0 likes  2 replies  Reader
- ⊙ save all open documents in psd
  0 likes  37 replies  Photoshop
- ⊙ Unable to load my cloud documents in CC and XD.
  0 likes  4 replies  XD

Related conversations
*Updated Jul 13, 2018 • Acrobat*
⊙ The document could not be saved. There was a problem reading this document (114) - From Acrobat Standard DC, I have a 20MB pdf file open, I click File then Save As and save it to my c...

*Updated Oct 14, 2019 • Adobe Acrobat*
⊙ The document could not be saved. There was a problem reading this document (114) work with PDF files that typically contain up to 200 pages (created frm MS Word), I use highlight...

*Updated Jan 04, 2017 • Acrobat*
⊙ What causes this error? The document could not be saved. There was a problem reading this document (114) I have read the previous discussion about this error and I would like a more specific answer to this....

① 2  3

Related conversations
*Updated Mar 21, 2018 • Acrobat Reader*
⊙ There was a problem opening this document. There was a problem reading this document (11). I keep getting this error message whenever I try to open any new PDFs. There was a problem opening t...

*Updated Oct 11, 2020 • Acrobat*
⊙ There was a problem reading this document (114) - Remove Hidden information We just upgraded from Acrobat Pro XI to Acrobat DC Pro. We have a financial management system that p...

*Updated Feb 23, 2018 • Acrobat Reader*
⊙ There was an error opening this document. There was a problem reading this document (11). Hi, When opening the pdf of a book chapter in Acrobat Pro DC (v 2015.010.20056), that I downloaded f...

1 ② 3

Related conversations
*Updated Apr 01, 2017 • Acrobat Reader*
⊙ "There was a problem reading this document". Illustrator document error: "There was a problem reading this document "The above error mess...

*Updated Nov 12, 2020 • Acrobat Reader*
⊙ There was a problem reading this document (14). Hello, I'm trying to iopen document in adobe acrobat professional or reader it gives me this error howe...

*Updated Nov 12, 2020 • Acrobat*
⊙ There was a problem reading this document (15). I am getting an error when I try to delete a page in a document. There was a problem reading this d...

SEMANTICS-AWARE HYBRID ENCODER FOR IMPROVED RELATED CONVERSATIONS

TECHNICAL FIELD

Embodiments of the present disclosure are directed to a method of identifying user posts on an online forum relevant to a query post.

DISCUSSION OF THE RELATED ART

The Internet is a great resource for users to find solutions to problems. Online forums where users post queries answered by other users are widely available for users seeking answers or solutions to their problems. Users who post queries may receive answers or other posts that may be highly relevant or in most cases not relevant at all to the queries. Not every query that is posted online is novel and there may be related conversations previously posted online, and the users might be able to refer to such conversations that have already been answered to resolve their issue. It is important for companies to invest in keeping community engagement active, positive, and organic. The right set of related conversations can ensure that users find what they are looking for as well as providing the opportunity to explore their area of interest further through related conversations. In addition, the quicker the questions are resolved; the more likely customers are retained.

Recommending conversations based on relevance is a well-known task in both academia and industry. Existing techniques use either keyword matching or frequency based matching to match a user-query to the documents and then use a page-rank like algorithm to rank the results based on relevance. However, existing techniques fail to capture the meaning of a query, especially when it becomes large and complex. This situation becomes challenging when searching relevant documents based on a user-query as the text-snippet do not match the text entered by the user.

Current existing methods utilize the subject to recommend semantically similar posts. Some solutions match the subject line of the posts without comparing the bodies of the posts, which contain much useful information. The subject contains limited information and might not capture the exact issue that the user is looking for. Thus, existing solutions for finding related conversations might not suggest the best conversation which solves an issue, which leads to a bad customer experience.

The challenge is to suggest related conversations for a given query post based on the similarity in the context in the body, i.e., the content of the post, as well as matching subject lines.

SUMMARY

Embodiments of the disclosure provide a method to encode the context of the conversations from the body of a post along with the subject of the post, thus improving the overall quality. The results retrieved from a model according to an embodiment better encode the context of the post and thus provide better quality recommendations. A computer-implemented system according to an embodiment retrieves the most relevant online documents given an online query document using a 3-level hierarchical ranking mechanism. Embodiments of the disclosure include a computer-implemented semantics-oriented hybrid-search technique for encoding the context of the online documents, resulting in better retrieval performance. A computer-implemented boosting technique captures multiple metrics and provides a hierarchical ranking criterion. The boosting technique can boost rankings for documents involving the same board, the same product, the same OS Version and the same app version, etc. A method for recommending online conversations relevant a given query post can be implemented as a computer application that is incorporated into the software that supports the online forum, and would be automatically invoked when a user posts a query.

According to an embodiment of the disclosure, there is provided a computer-implemented method of finding online relevant conversing posts, including: receiving, by a web server serving an online forum, a query post from an inquirer using the online forum, wherein the online forum facilitates conversing posts from users on subjects that are relevant and irrelevant to the query post; computing, by a contextual similarity scoring module, a contextual similarity score between each conversing post of a set of conversing posts in the online forum with the query post, wherein the query post and each conversing post of the set of conversing posts includes a subject and a body, wherein the contextual similarity score is computed between the body of each of the set of conversing post and the body of the query post, wherein N1 conversing posts of the set of conversing posts with a highest contextual similarity score are selected; computing, by a fine grained similarity scoring module, a fine grained similarity score between an embedding of the subject of the query post and an embedding of the subject of each of the $N_1$ selected conversing posts, wherein N2 finer conversing posts of the set of conversing posts with a highest fine grained similarity score are selected, wherein N2<N1; boosting, by a boosting module, the fine grained similarity scores of the N2 finer conversing posts based on one or more relevance metrics, wherein N3 boosted conversing posts with a highest boosted fine grained similarity score are selected as a list of conversing posts most relevant to the query post, wherein N3<N2; and displaying, by the web server, the N3 selected online documents to the user, wherein the N3 boosted conversing posts most relevant to the query post to a display of the inquirer.

According to another embodiment of the disclosure, there is provided a computer-implemented system for finding, in an online forum, conversing posts relevant to a query post, including: a subject encoding module that calculates a subject embedding vector of a subject of a query post received by a web server serving an online forum and subject embedding vectors of a set of conversing posts previously posted to the online forum, wherein each of the query post and the set of conversing posts includes a subject and a body, wherein a user wants to find other conversing post in the online forum that are relevant to the query post; a fine grained relevance scoring module that calculates a fine grain similarity score between the subject embedding vectors of the query post and the set of conversing post, and that selects N2 conversing posts from the set of conversing posts with a highest fine grained relevance scorer with respect to the query post; a boosting module that boosts the fine grain similarity score of at least some of the N2 conversing posts based on one or more relevance metrics and selects N3 boosted conversing posts with a highest boosted fine grain similarity score from the N2 selected conversing posts as a list of conversing posts most relevant to the query post, wherein N3<N2, wherein the N3 selected online documents are displayed to the user by a display device, wherein the N3 selected online documents are those online documents of the set of previous online documents in the online forum that are most relevant to the query; and a display device wherein the N3 boosted conversing post are displayed to the user by the web server.

According to another embodiment of the disclosure, there is provided a computer-implemented method of retrieving online relevant conversing posts, including receiving, by a web server serving an online forum, a query post from an inquirer using the online forum, wherein the online forum facilitates conversing posts from users on subjects that are relevant and irrelevant to the query post; computing, by a contextual similarity scoring module, a contextual similarity score between each conversing post of a set of conversing posts in the online forum with the query post, wherein the query post and each conversing post of the set of conversing posts includes a subject and a body, wherein the contextual similarity is computed between the body of each of the set of conversing posts and the body of the query post, wherein N1 conversing posts of the set of conversing posts with a highest contextual similarity score are selected; and computing, by a fine grained similarity scoring module, a fine grained similarity score between an embedding of a subject of the query post and embeddings of a subject of each of the $N_1$ selected conversing posts by applying a computer-implemented multi-lingual classifier to the subject of the query post and each of the N1 selected conversing posts where embedding are obtained from the subject of the query post and from each of the N1 selected conversing posts, and calculating a similarity between the embedding of the subject of the query post and of each conversing post of the N1 selected conversing posts, wherein N2 conversing posts of the N1 selected conversing posts with a highest fine grained similarity score are selected, wherein N2<N1, wherein the N2 selected conversing posts are those conversing posts of the set of conversing posts in the online forum that are relevant to the received query.

BRIEF DESCRIPTION OF THE DRAWINGS

FIGS. 4A-B illustrate conversation recommendations of a previous system and those generated by a conversation recommendation system according to an embodiment.

DETAILED DESCRIPTION

Companies hosting online forums have an investment in keeping community engagement in the online forum active, positive and organic. With a right set of related conversations, users can find what they are looking for as well as having an opportunity to further explore their area of interest through related online conversations. The quicker the questions are resolved, the more likely customers are retained. Users often post queries on the online forums which may or may not be answered instantaneously. Many queries require inputs from experts. However, not every query that is posted is novel and there may be related conversations that have been previously posted, and the users might be able to refer to such conversations to resolve their issue.

Current existing online methods utilize the subject of the post to recommend semantically similar posts. Some solutions match the subject line of the posts without comparing the bodies of the posts, which contain much useful information. The subject contains limited information and might not capture the exact issue that the user is looking for. Existing solutions for related conversations currently being used might not suggest the best conversation which solves an issue, which leads to a bad customer experience.

Existing solutions like BERT, TF-IDF or GLoVe vectors, match the subject line of the posts without comparing the bodies of the posts, which contain much useful information. The subject contains limited information and might not capture the exact issue that the user is looking for. The existing solutions for related conversations being used by communities' platform might not suggest the best conversation which solves an issue, which leads to a bad customer experience. It is important for companies to invest in keeping community engagement active, positive, and organic. The right set of related conversations can ensure that users find what they are looking for as well as providing the opportunity to explore their area of interest further through related conversations. In addition, the quicker the questions are resolved; the more likely customers are retained.

The challenge is to suggest related conversations for a given query post based on the similarity in the context in the body, i.e., the content of the post, as well as matching subject lines.

Embodiments of the disclosure provide a semantics-oriented hybrid search technique that uses page-ranking along with the generalizability of neural networks that retrieve related online conversations for a given query post, and do so essentially instantaneously. Results show significant improvement in retrieved results over the existing techniques.

The task of semantic-searching can be used to improve searches in various products that utilize textual content. These uses include semantic searches, analyzing textual reviews on a product page on e-commerce websites to cluster similar reviews, natural language understanding and answering questions posted online.

At least one embodiment of the disclosure uses a computer system that encodes the context of the conversations from the body of the post along with the subject of the post, thus improving the overall quality. An online based semantics-oriented hybrid search is used with a hierarchical ranking technique that recommends the best related conversations and that utilizes the context of the query post along with the generalizability of neural networks. A computer-implemented system according to an embodiment first short-lists conversations that have a similar context, based on the bodies of the posts, and then recommends the highly relevant posts based on the subject of the post. The hierarchical ranking used by systems according to embodiments of the disclosure ensures the recommended conversations are relevant, increasing the probability of a user engaging with those posts. Other benefits expected from use of computer-implemented online systems according to embodiments of the disclosure include increased page views, member entrances, time remaining onsite, posts submitted, accepted solutions, and liked posts.

The following terms are used throughout the present disclosure.

The term "query" or "post" refers to a document submitted by a user to an Internet forum or message board, which is a computer implemented online discussion site where people can hold conversations in the form of posted messages or documents. A query typically includes a header or title that identifies the subject of the query, and the body, which contains the substance of the query.

The term "online forum" refers to a computer-implemented Internet forum, discussion group or community in which the subject of the posts is directed to a particular subject matter, such as a technology.

The term "semantic search" refers to a computer-implemented online search with meaning, as opposed to a lexical search in which the search engine looks for literal matches of the query words or variants of them, without understanding the overall meaning of the query. Semantic search seeks to improve search accuracy and generate more relevant results by understanding the contextual meaning of terms as they appear in a searchable dataspace.

The term "embedding" refers to the representation of text, typically in the form of a real-valued vector that encodes the meaning of the text such that the documents that are closer in the vector space are expected to be similar in meaning.

The term "A/B testing" refers to a randomized experiment with two variants, A and B, to compare two versions of a single variable, typically by testing a subject's response to variant A against variant B, and determining which of the two variants is more effective.

The term "tf-idf", or TFIDF, short for term frequency-inverse document frequency, refers to a numerical statistic that reflects how important a word is to a document in a collection of document. The tf-idf value increases proportionally to the number of times a word appears in the document and is offset by the number of documents in the corpus that contain the word, to adjust for the fact that some words appear more frequently in general.

The term "cosine similarity" refers to measure of similarity between two non-zero vectors and is defined by the cosine of the angle between them, which is the same as the inner product of the same vectors normalized to unit length. The unit vectors are maximally similar if they are i.e., similarity=1, and maximally dissimilar, i.e., similarity=0, if they are orthogonal.

The term "BERT" refers to a computer-implemented transformer language model known as Bidirectional Encoder Representations from Transformers, a transformer-based machine learning technique for natural language processing (NLP). BERT has variable number of encoder layers and self-attention heads, and was pretrained on two tasks: language modeling to predict tokens from context, and next sentence prediction to predict if a chosen next sentence was probable or not given the first sentence. After pretraining, BERT can be fine tuned to optimize its performance on specific tasks.

The term "transformer" refers to a computer-implemented deep learning model that uses the attention mechanism to differentially weigh the significance of each part of the input data. The attention mechanism identifies the context for each word in a sentence without necessarily processing the data in order.

The term "boosting" refers to increasing a similarity score between two online posts or documents based on shared references of the two posts or documents.

Figure 1A:
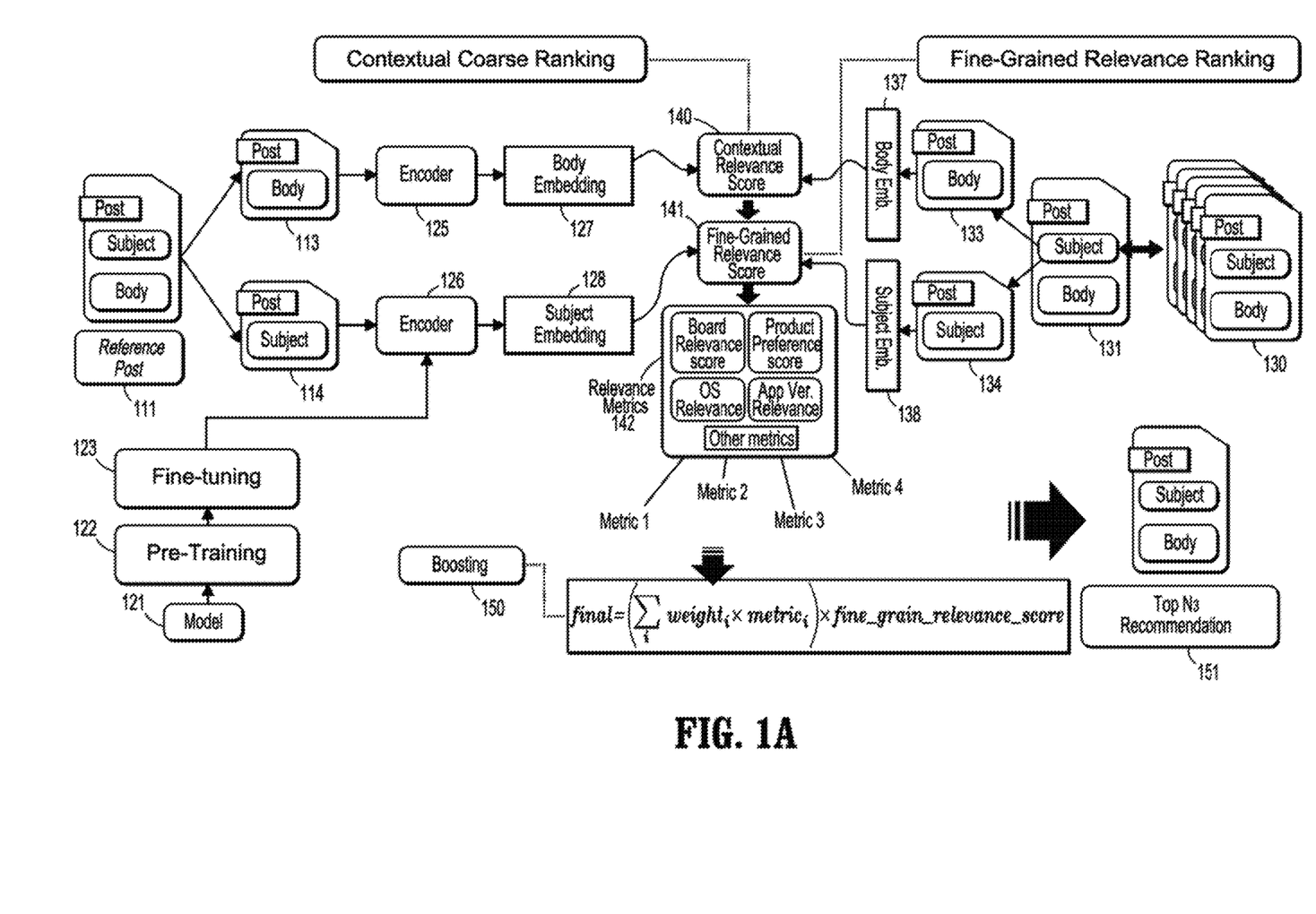
FIG. 1A is a block diagram of an overall system that illustrates the different stages of a method according to an embodiment.

FIG. 1 is a block diagram of an overall computer-implemented system that illustrates the different stages of a method according to an embodiment. Referring to the figure, a query is posted in an online forum server that serves as a reference post 111 that is split into a body 113 and a subject 114. A body encoding module 125 calculates a body embedding 127 of the body 113, and a subject encoding module 126 calculates a subject embedding 128 of the body 114. An exemplary, non-limiting body encoding module 125 is a tf-idf encoding module. The subject encoding module 126 is a computer-implemented multilingual model 121, which is pre-trained at block 122 and fine tuned for semantic searching at block 123. An exemplary, non-limiting computer-implemented multilingual model 121 is a BERT model.

A contextual similarity scoring module 140 compares the body embedding 127 of the reference post 111 against a body embedding 137 of the body 133 of a post 131 in the complete corpus 130 of posts in the online forum to calculate a contextual relevance score, as will be described below. A first number $N_1$ of posts with a highest contextual relevance score are selected for further processing.

A fine-grained similarity scoring module 141 compares the subject embedding 128 of the reference post 111 against a subject embedding 138 of the subject 134 of the first number $N_1$ of posts 131 of the complete corpus 130 of posts in the online forum to calculate the fine-grained relevance score, as will be described below. A second number $N_2$ of posts with a highest fine grained relevance score, where $N_2 < N_1$, will be selected for further processing.

A boosting module 150 uses various metrics 142 to boost the fine-grained relevance scores of the second number $N_2$ of posts based on various other relevance measures, as will be described below. A final score for each of the second number $N_2$ of posts is calculated by the boosting module 150 as a weighted sum over the various other relevance measures, from which a third number $N_3$ with the highest final scores are selected as the top $N_3$ recommendations 151. The $N_3$ selected online posts are then displayed to the user by a display device.

Figure 1B:
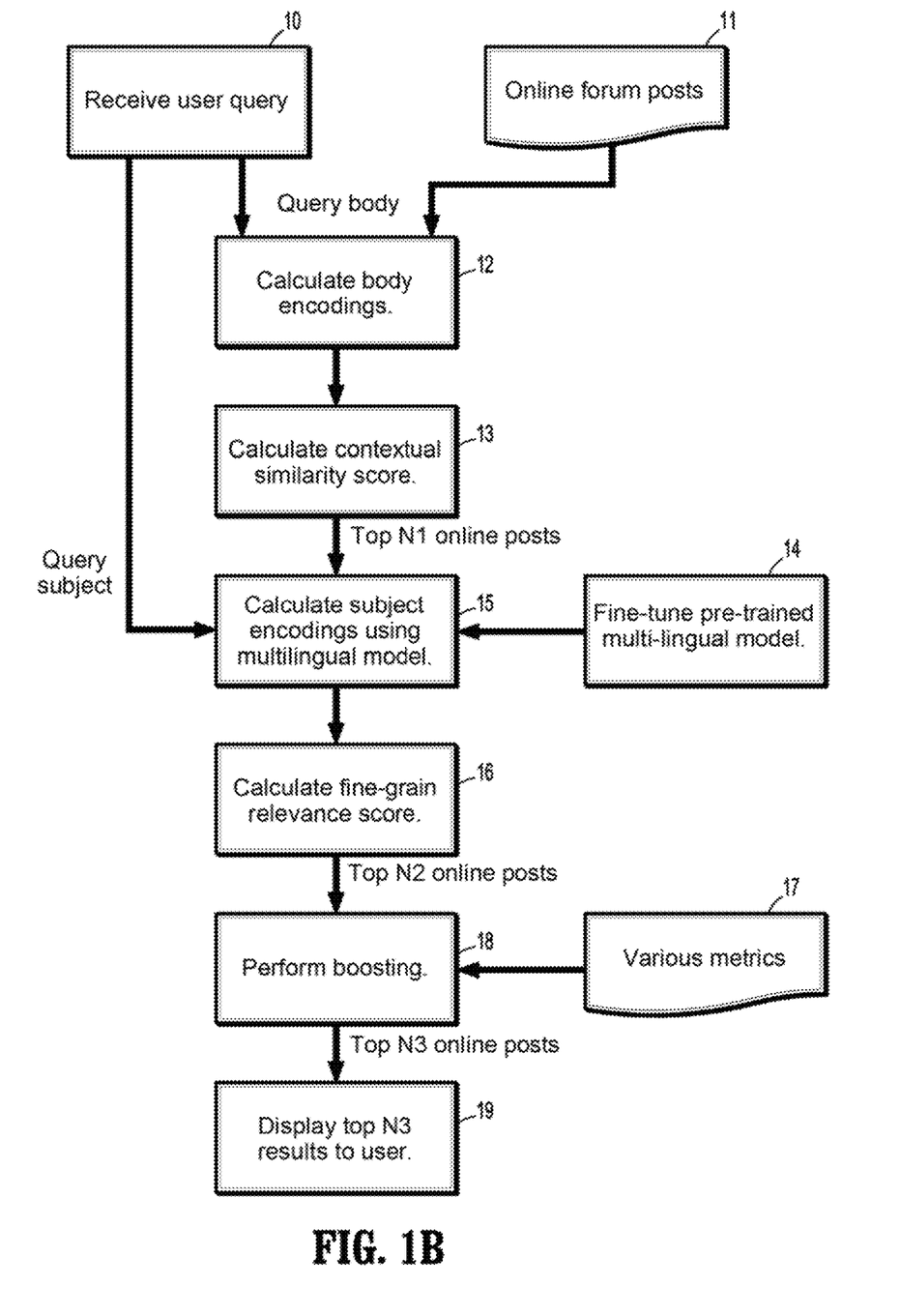
FIG. 1B is a flow diagram of a method of retrieving posts relevant to a query post, according to an embodiment.

FIG. 1B is a flow diagram of a computer-implemented method of retrieving online posts relevant to a query post, according to an embodiment. A method begins by receiving, at step 10, by an online forum server, a query post from a user of an online forum. The query post may be a question from the user that the user wants answered by finding other posts from a set of online posts 11 in the online forum that are relevant to the query post. The query post and each post of the set of online posts 11 include a subject and a body. At step 12, a body encoding module calculates an embedding from the body of each post of the set of online posts and an embedding from the body of the query post. The embeddings of the body of the query post and each of the posts of the set of online posts are used by a contextual similarity scoring module at step 13 to calculate a contextual similarity score between the query post and each post of a set of online posts, and the N1 posts of the set of online posts with the highest contextual similarity score are selected for further processing. At step 14, a computer-implemented pre-trained multi-lingual model is fine tuned for determining semantic similarities. The fine tuned computer-implemented multi-lingual model is used at step 15 by a subject encoding module to calculate embeddings of the subject of the query post and the subject of each of the N1 selected online posts. At step 16, a fine grained similarity scoring module calculates a fine grained similarity score between the embedding of the subject of the query post and the embeddings of the subject of each of the N1 selected online posts, and N2 posts of the set of N1 online posts with a highest fine grained similarity score are selected for further processing, wherein $N2 < N1$. At step 18, a boosting module performs boosting on the N2 selected online posts based on one or more relevance metrics 17, in which the fine grained similarity score of at least some of the N2 selected online posts is boosted by a weighted sum of the relevance metrics 17 of the N2 selected online posts. The boosting module selects the N3 highest posts with the highest boosted fine grained similarity score from the N2 selected online posts as a list of online posts relevant to the query post, where $N3 < N2$, these N3 selected online posts are displayed to the user by a display device at step 19 as the most relevant online posts for answering the query posted by the user.

Contextual Coarse Ranking: For a first level, the relevance between the body of the conversations of a online forum with the body of the query post for which a user wants to find the similar conversations is measured. For this, the cosine similarity between the TF-IDF vectors of each of the online forum posts and a TF-IDF vector of the query post is computed by a contextual similarity scoring module, and a shortlist of the $N_1$ relevant online forum posts with maximum similarity between the body context of the query post and the body contexts of the online forum posts are selected by the contextual similarity scoring module. Alternatively, an L2 distance is used to determine the similarity between the TF-IDF vectors. This ensures that posts that have similar contexts appear in the shortlisted posts. In an embodiment, $N_1$ equals 200, but embodiments are not limited thereto. In an embodiment, the value of $N_1$ is based on a predetermined threshold, but embodiments are not limited thereto, and in other embodiments, the value of $N_1$ is determined without reference to a threshold.

Fine-Grained Relevance Ranking: After obtaining the top $N_1$ relevant online forum posts based on the body-context, the $N_1$ posts are ranked based on fine-grained relevance. For this a computer implemented multi-lingual classifier is used to obtain the embeddings of the subject of these $N_1$ selected online forum posts, which are converted to a numeric vector representation, based on both word level information and the sequence of words, and then the relevance is computed by a fine-grained similarity scoring module using the $L_2$ distance metric with the embedding of the query post. Based on the defined metric, the top $N_2$ related conversations are selected, where $N_2 < N_1$. In an embodiment, $N_2 = 25$, but embodiments are not limited thereto. In an embodiment, the value of $N_2$ is based on a predetermined threshold, but embodiments are not limited thereto, and in other embodiments, the value of $N_2$ is determined without reference to a threshold.

To obtain the post embeddings, a pre-trained computer-implemented classifier was used that was fine-tuned for the task of semantic search. This ensures that the classifier encodes similar posts with embeddings that lie closer in the vector space.

An exemplary, non-limiting trained computer-implemented multi-lingual classifier is the BERT classifier, which is pre-trained on unlabeled data over different tasks. For fine tuning, the BERT model is initialized with the pre-trained parameters, and then is fine-tuned using labeled data for the semantic search tasks. Methods of fine tuning are known in the art.

Boosting: To ensure that the related online forum conversations are from the same online board as the query post while at the same time not completely excluding posts from other online boards, boosting is performed by a boosting module to ensure that posts from the same online board as the query post are given higher preference. The $N_2$ related conversations are ranked based on the value of their distance metrics, and then the ranking of individual conversations is boosted based on one or more of a plurality of metrics. The boosting depends only on the fine grained relevance scores and does not need to refer to the actual text. These metrics include, but are not limited to: a board relevance score, mentioned above, in which the rank of conversations from the same board as the query post are boosted; a product preference score, in which the rank of conversations about a particular product discussed in the user's post are boosted; an OS relevance score, in which the rank of conversations that reference the same operating system version as the user's query post are boosted; and an application version relevance score, in which the rank of conversations that reference the same version of an application as the user's query post are boosted. The boosting is based on a weighted sum of one or more of these metrics, as represented by the following equation:

$$\text{final} = \left(\sum_i \text{weight}_i \times \text{metric}_i\right) \times \text{fine\_grain\_relevance\_score}$$

where final represents the final boosted rank of each of the $N_2$ related conversations, $\text{metric}_i$ and $\text{weight}_i$ are the metric and its associated weight, respectively, and the weights are determined based on an evaluation of each of the metrics with respect to the $N_2$ related conversations. These boosting techniques ensure the recommendations are more relevant to the query post and match the online board as well.

After the boosting stage, the top $N_3$ posts are selected out of the $N_2$ selected online posts that constitute the final list of recommendations. In an embodiment, $N_3 = 9$, but embodiments are not limited thereto. The top N3 selected online posts are displayed to the user. In an embodiment, the value of $N_3$ is based on a predetermined threshold, but embodiments are not limited thereto, and in other embodiments, the value of $N_3$ is determined without reference to a threshold.

A recommendation system according to an embodiment has a variety of relevant use cases.

Semantic Search: A popular query is a semantic search on a search engine. Searching for content on the web is akin to finding needle in the haystack, but search engines provide results to search queries in milliseconds. An approach according to an embodiment generates textual embeddings that capture the "context" of the text. This is used to search through billions of posts to identify relevant text content. This is useful for searching for similar text in scanned documents, etc.

Reviews based Recommendation: The semantically similar embeddings from an approach according to an embodiment are used to analyze textual reviews on a product page on e-commerce websites and to easily cluster similar reviews. This useful for clustering documents and emails together.

Natural Language Understanding (NLU): The task of NLU involves understanding the intention/emotion/context of a text which is then be utilized for other tasks. Since an approach according to an embodiment generates semantically similar embeddings along with the context, it helps generate embeddings.

Question Answering Retrieval: In some forums, user post questions and either experts or users of the forum post answers to those. Usually, it takes a few hours for the dedicated experts to identify the new post and answer the query. Since an approach according to an embodiment searches for semantically similar posts, it identifies similar posts that were answered by experts and then recommends similar solutions when an expert is unavailable.

An evaluation of a method according to an embodiment is performed using A/B testing in production and the results are compared with the existing state-of-the-art methods. The quality of recommendations is better than earlier models and the increases in various performance indices indicates an increased business value.

An experimental conversation recommendation system according to an embodiment was tested on a marketing community platform, to find more relevant content for its members, along with driving improved community engagement and product adoption for the users.

Recommendations are currently based on a user's viewed posts or submitted comments and threads. Members are recommended between 6-10 articles daily depending on their historical community activity.

For reporting purposes, members were randomly assigned into test or control groups, with the former receiving recommendations and the latter receiving no recommendations. With over 19K individual recommendations served so far, some metrics when comparing the test to the control include:

12% increase in page views;
5% increase in member entrances;
6% increase in minutes online;
44% increase in posts submitted;
101% increase in accepted solutions; and
19% increase in liked posts.

These results indicate that users receiving recommended content tend to spend more time on the community, are more likely to engage with their peers, and tend to find more questions that they can answer.

To validate the quality of recommendations, related conversations generated by a model according to an embodiment were evaluated by human domain-experts. 77 posts that cover different unique cases were selected for validation, ensuring that the complete set of possible posts were covered or a more accurate evaluation. From these, the experts were asked to select which experience has better recommendations.

Figure 2:
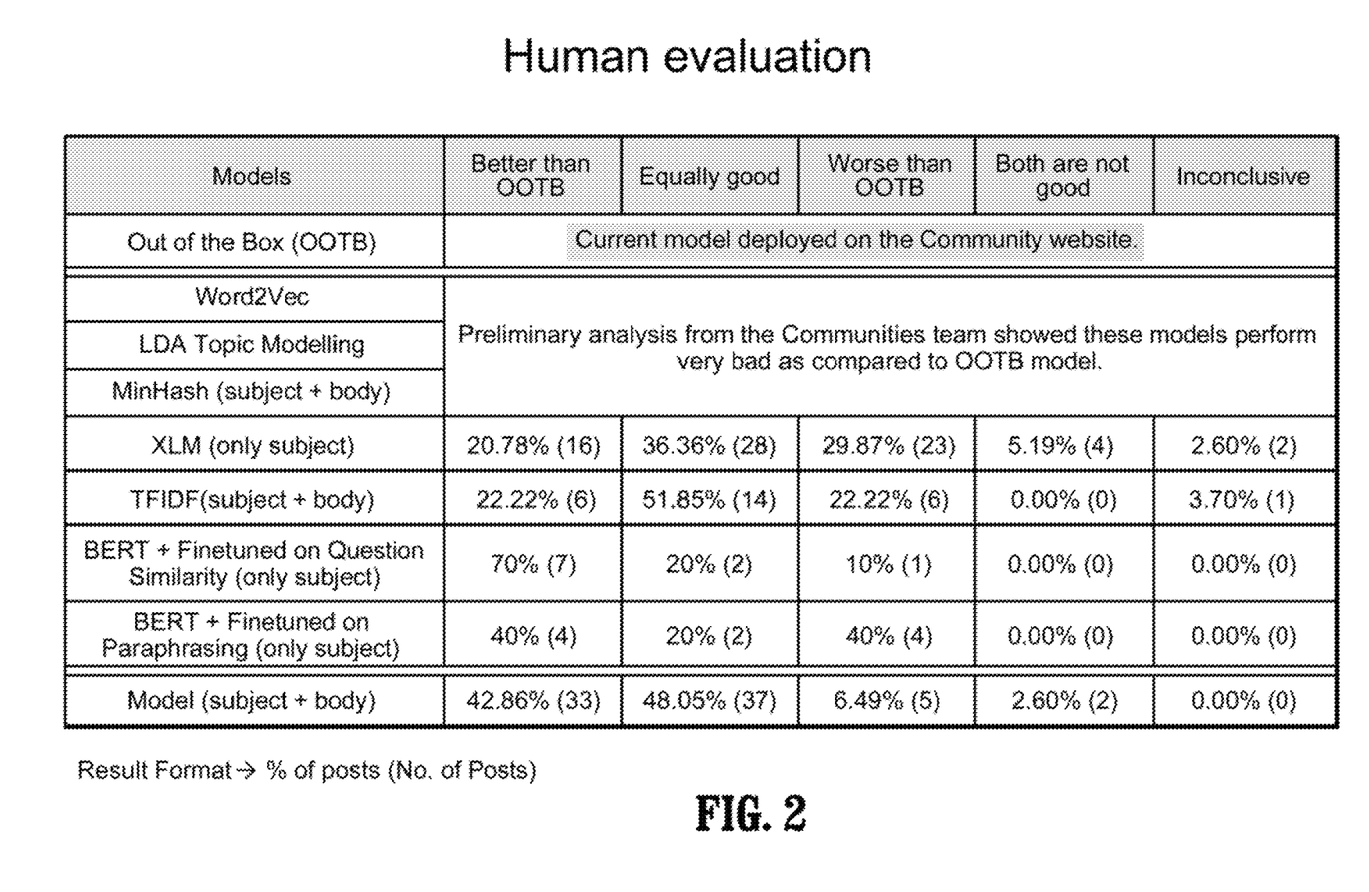
FIG. 2 is a table of results of an expert comparison of a conversation recommendation system according to an embodiment to other language processing models.

The results have been summarized in the table of FIG. 2 along with the other methods that were compared against. For the models listed on the left side, the table indicates, for each model, the percentage of results that are better than an out of the box (OOTB) implementation currently implemented on a community support platform, the percentage of results that are equally good as the OOTB, the percentage of results that are worse than OOTB, the percentage where both are not good, and the percentage that are inclusive. In particular, FIG. 2 shows that 91% of the conversations recommended by a model according to an embodiment were rated as being better or equally good as recommendations from the OOTB.

An A/B test was carried out for a selected (US-region) audience to evaluate the engagement of the users on related conversations component, i.e., a click through rate, generated by a model according to an embodiment versus those generated by an OOTB model.

28,515 clicks were observed on a related conversations component powered by a model according to an embodiment vs 23,405 clicks on an already existing OOTB component. Thus, the engagement on a new component according to an embodiment is 22% greater than an already existing OOTB component.

Figure 3:
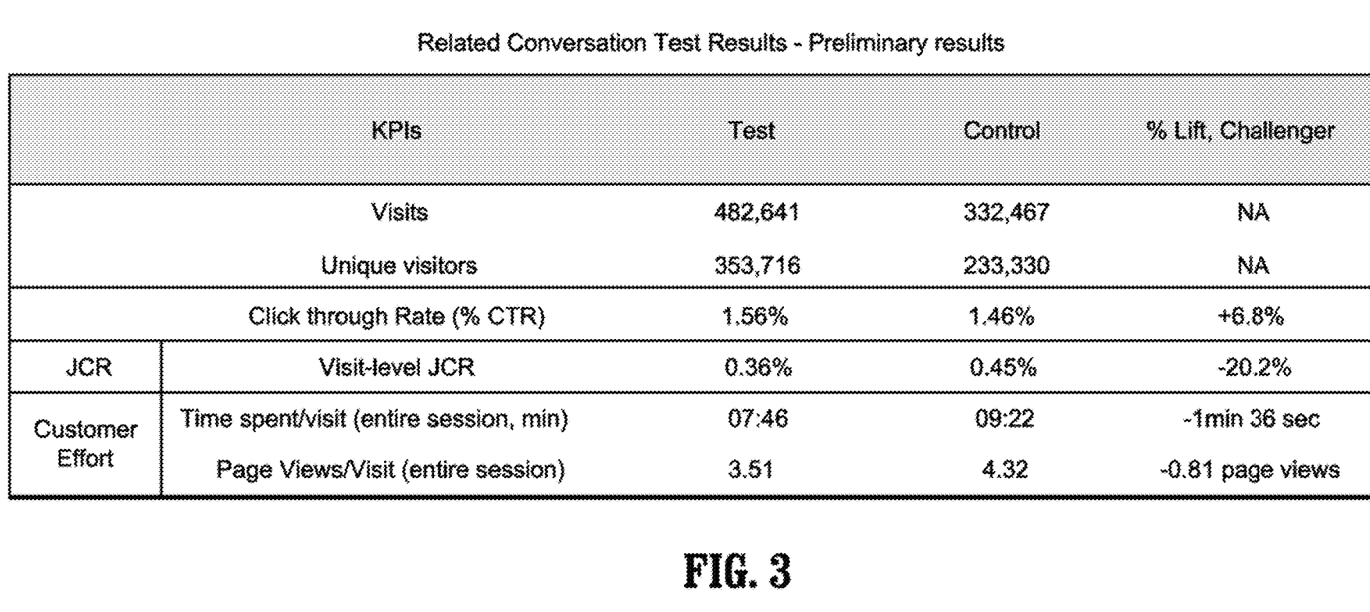
FIG. 3 is a table of key performance indicator results of an A/B test of a conversation recommendation system according to an embodiment an out-of-the box (OOTB) language model.

With ML driven related conversations, an increased feature usage was seen with a 7% uptick in click throughs resulting in 20% reduction in Jarvis Conversation rate, which is a measure of the percentage of user visits that request an online chat help. FIG. 3 shows the different performance metrics that were tracked for the A/B testing experiment along with the results. As can be seen, there was a 6.8% increase in click through rate and a 20.2% decrease in the visit-level JCR rate, which are statistically significant differences.

From the A/B testing results, it can be observed that there is a 22% increase in user engagement, as measured by user clicks, a 19% decrease in the time it takes to find an answer, resulting in faster resolution times, and a 20% drop in the visits to the online chat help. Also, the improvement in the key performance indicators is statistically significant with more than 99% confidence score. This means that one can be 99% confident that the results that obtained are a consequence of the changes made by a model according to an embodiment, and not a result of random chance.

Figure 4B:
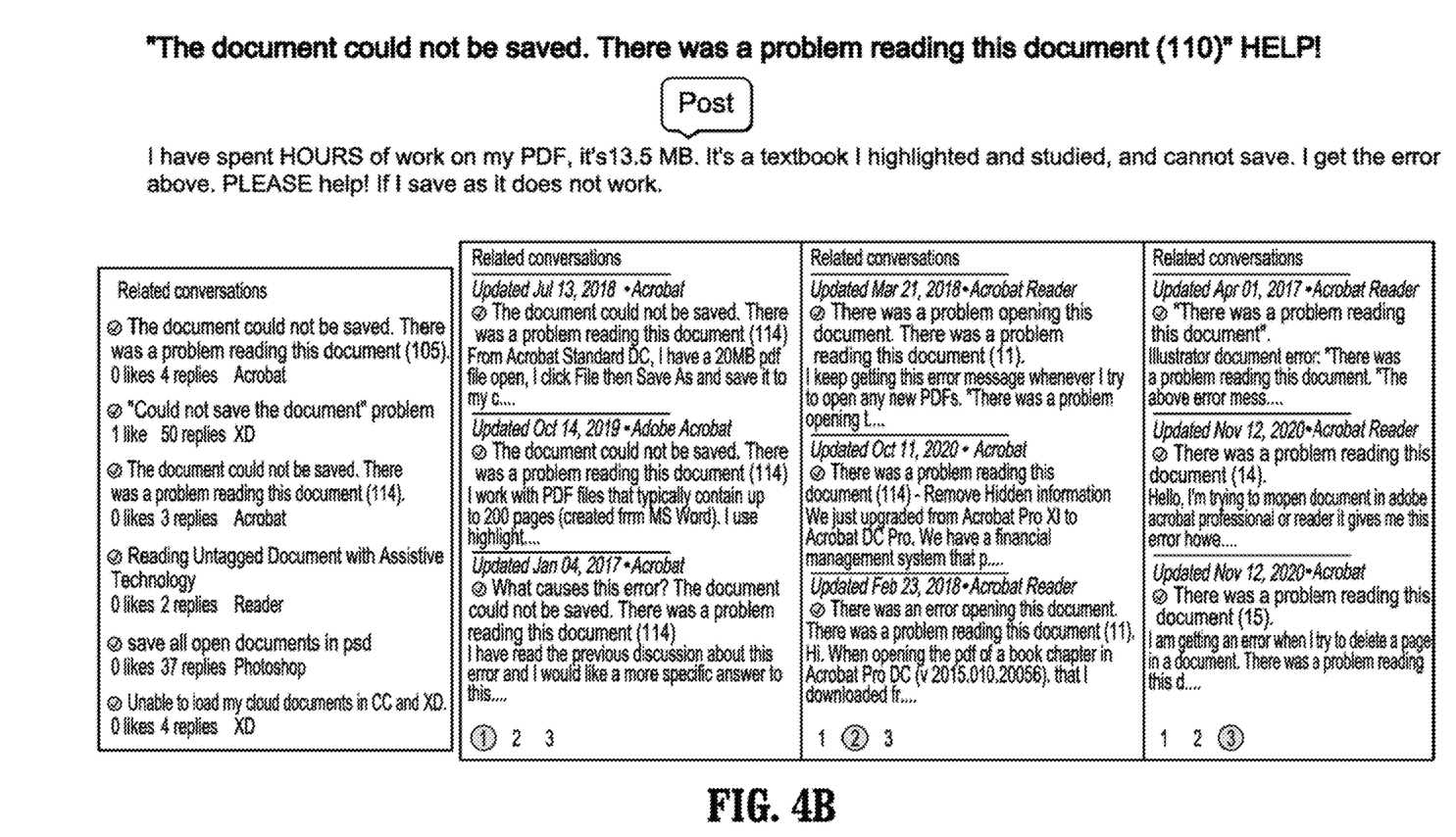

FIGS. 4A-B illustrates some qualitative results as compared with previous models. In FIG. 4A, the subject of the post is "All my scans have disappeared", and the body of the post is below the subject. The related conversations returned by a conventional model are listed on the left, and the 9 related conversations returned by a model according to an embodiment are shown on the right. In FIG. 4B, the subject of the post is "'This document could not be saved. There is a problem reading this document" (110)" HELP!', and the body of the post is below the subject. The related conversations returned by a conventional model are listed on the left, and the 9 related conversations returned by a model according to an embodiment are shown on the right. As can be seen, the related conversations shown on the right include more information and the information is more relevant to the posted query than the conversation shown on the left.

Figure 5:
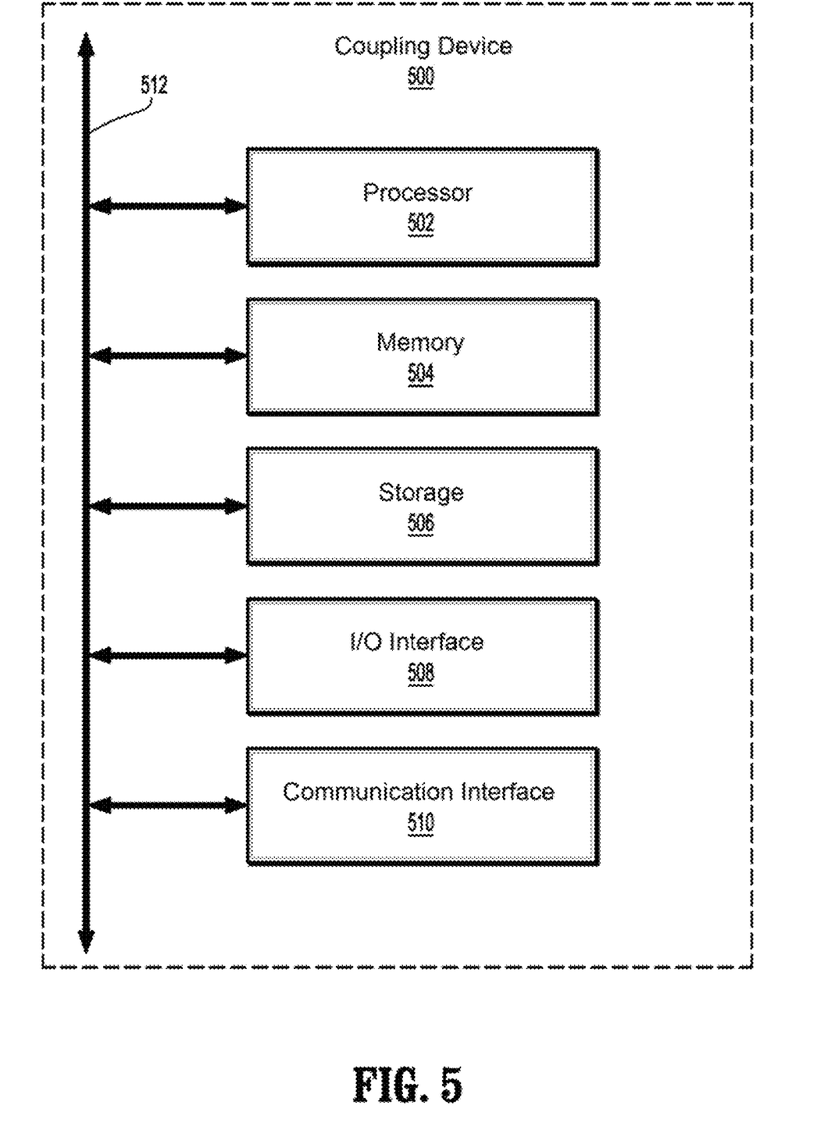
FIG. 5 illustrates a block diagram of an exemplary computing device that implements a conversation recommendation system according to an embodiment.

FIG. 5 illustrates a block diagram of an exemplary computing device 500 that may be configured to perform one or more of the processes described above. One will appreciate that one or more computing devices, such as the computing device 500, may represent the computing system described above, such as the system of FIG. 1. In one or more embodiments, the computing device 500 may be a mobile device, such as a mobile telephone, a smartphone, a PDA, a tablet, a laptop, a camera, a tracker, a watch, a wearable device, etc). In some embodiments, the computing device 500 may be a non-mobile device, such as a desktop computer or another type of client device. Further, the computing device 500 may be a server device that includes cloud-based processing and storage capabilities.

As shown in FIG. 5, the computing device 500 can include one or more processor(s) 502, memory 504, a storage device 506, input/output interfaces 508 (or "I/O interfaces 508"), and a communication interface 510, which may be communicatively coupled by way of a communication infrastructure, such as bus 512. While the computing device 500 is shown in FIG. 5, the components illustrated in FIG. 5 are not intended to be limiting. Additional or alternative components may be used in other embodiments. Furthermore, in certain embodiments, the computing device 500 includes fewer components than those shown in FIG. 5. Components of the computing device 500 shown in FIG. 5 will now be described in additional detail.

In particular embodiments, the processor(s) 52 includes hardware for executing instructions, such as those making up a computer program. As an example, and not by way of limitation, to execute instructions, the processor(s) 502 may retrieve (or fetch) the instructions from an internal register, an internal cache, memory 504, or a storage device 506 and decode and execute them.

The computing device 500 includes memory 504, which is coupled to the processor(s) 502. The memory 504 may be used for storing data, metadata, and programs for execution by the processor(s). The memory 504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 504 may be internal or distributed memory.

The computing device 500 includes a storage device 506 for storing data or instructions. As an example, and not by way of limitation, the storage device 506 can include a non-transitory storage medium described above. The storage device 506 may include a hard disk drive (HDD), flash memory, a Universal Serial Bus (USB) drive or a combination these or other storage devices.

As shown, the computing device 500 includes one or more I/O interfaces 508, which are provided to allow a user to provide input to (such as user strokes), receive output from, and otherwise transfer data to and from the computing device 500. These I/O interfaces 508 may include a mouse, keypad or a keyboard, a touch screen, camera, optical scanner, network interface, modem, other known I/O devices or a combination of such I/O interfaces 508. The touch screen may be activated with a stylus or a finger.

The I/O interfaces 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 508 are configured to provide graphical data to a display for presentation to a user. The graphical data may be representative of one or more graphical user interfaces or any other graphical content as may serve a particular implementation.

The computing device 500 can further include a communication interface 510. The communication interface 510 can include hardware, software, or both. The communication interface 510 provides one or more interfaces for communication (such as, for example, packet-based communication) between the computing device and one or more other computing devices or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI. The computing device 500 can further include a bus 512. The bus 512 can include hardware, software, or both that connects components of computing device 500 to each other.

In the foregoing specification, the invention has been described with reference to specific example embodiments thereof. Various embodiments and aspects of the invention are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method of finding online relevant conversing posts, comprising:

receiving, by a web server serving an online forum, a query post on the online forum and a plurality of posts on the online forum;

generating a subject embedding and a body embedding for the query post, wherein the subject embedding is generated using a subject encoder based on a subject of the query post, and the body embedding is generated using a body encoder different from the subject encoder based on a body of the query post;

selecting, from the plurality of posts, a first number of posts based on the body embedding by computing, by a contextual similarity scoring module, a contextual similarity score between a conversing post of the online forum and the query post based on the body embedding for the query post;

selecting, from the first number of posts selected based on the body embedding, a second number of posts based on the subject embedding by computing, by a fine grained similarity scoring module, a fine grained similarity score between the query post and the conversing post based on the subject embedding for the query post, wherein the second number of posts is less than the first number of posts, wherein computing the fine grained similarity score between the subject embedding for the query post and the subject embedding for the conversing post comprises applying, by the subject encoder, a computer-implemented multi-lingual classifier to the subject of the query post and the subject of the conversing post and wherein the subject embedding for the conversing post is a first numeric vector, and the subject embedding for the query post is a second numeric vector, and calculating the fine grained similarity score comprises calculating an L2 distance between the first numeric vector and the second numeric vector; and providing, by the web server, the conversing post in response to the query post based on the contextual similarity score and the fine grained similarity score.

2. The computer-implemented method of claim 1, wherein computing the contextual similarity score between the conversing post of the online forum and the query post comprises:

calculating, by the body encoder, a body embedding for the conversing post and the body embedding for the query post; and calculating, by the contextual similarity scoring module, the contextual similarity score between the body embedding for the query post and the body embedding for the conversing post.

3. The computer-implemented method of claim 2, wherein the body embedding for the conversing post is a first tf-idf vector, and the body embedding for the query post is a second tf-idf vector, and calculating the contextual similarity score comprises calculating a cosine similarity between the first tf-idf vector and the second tf-idf vector.

4. The computer-implemented method of claim 1, further comprising boosting, by a boosting module, the fine grained similarity score between the query post and the conversing post based on one or more relevance metrics, wherein the one or more relevance metrics includes:

a board relevance metric, wherein the query post and the conversing post were posted on a same board of the online forum, a product preference metric, wherein the query post and the conversing post reference a same product as the query post are boosted, an operating system relevance metric, wherein the query post and the conversing post reference a same operating system, and an application version metric, wherein the query post and the conversing post reference a same application version.

5. The computer-implemented method of claim 4, wherein the boosting, by a boosting module, the fine grained similarity score between the query post and the conversing post based on the one or more relevance metrics comprises boosting the fine grained similarity score based on a weighted sum of the one or more relevance metrics.

6. A computer-implemented system for finding, in an online forum, conversing posts relevant to a query post, comprising:
 a subject encoder configured to calculate a subject embedding vector of a subject of a query post received by a web server serving the online forum and a subject embedding vector of a conversing post previously posted to the online forum;
 a body embedding configured to calculate a body embedding vector of a body of the query post and a body embedding vector of the conversing post;
 a fine grained relevance scoring module configured to calculate a fine grained similarity score between the subject embedding vector of the query post and the subject embedding vector of the conversing post, wherein the fine grained similarity is computed for a second number of posts based on the subject embedding vector, wherein the second number of posts are selected from a first number of posts selected based on the body embedding vector, and wherein the second number of posts is less than the first number of posts;
 a boosting module configured to boost the fine grained similarity score based on one or more relevance metrics, wherein the one or more relevance metrics includes:
  a board relevance metric, wherein the query post and the conversing post were posted on a same board of the online forum,
  a product preference metric, wherein the query post and the conversing post reference a same product,
  an operating system relevance metric, wherein the query post and the conversing post reference a same operating system, and
  an application version metric, wherein the query post and the conversing post reference a same application version; and
 a display device configured to provide the conversing post to a user by the web server in response to the query post based on the contextual similarity score and the fine grained similarity score.

7. The computer-implemented system of claim 6, further comprising:
 a contextual relevance scoring module configured to calculate a contextual similarity score between the body embedding vector of the query post and the body embedding vector of the conversing post.

8. The computer-implemented system of claim 7, wherein the body embedding vector of a body of a conversing post is a first tf-idf vector, wherein the body embedding vector of the body of the query post is a second tf-idf vector, and wherein the contextual similarity score between the query post and the conversing post is computed by calculating a similarity between the first tf-idf vector and the second tf-idf vector.

9. The computer-implemented system of claim 8, wherein the calculating the similarity comprises calculating a cosine similarity.

10. The computer-implemented system of claim 7, wherein the subject embedding vector of the subject of the query post and the subject embedding vector of the subject of the conversing post is calculated by applying a computer-implemented multi-lingual classifier to the subject of the query post and the subject of the conversing post;
 wherein the fine grained similarity score between the subject embedding vector of the query post and the subject embedding vector of the conversing post is computed by calculating a similarity between the query post and the conversing post.

11. The computer-implemented system of claim 10, wherein the calculating the similarity comprises calculating an L2 distance.

12. A computer-implemented method of retrieving online relevant conversing posts, comprising:
 receiving, by a web server serving an online forum, a query post on the online forum and a plurality of posts on the online forum;
 generating a subject embedding and a body embedding for the query post, wherein the subject embedding is generated using a subject encoder based on a subject of the query post, and the body embedding is generated using a body encoder different from the subject encoder based on a body of the query post;
 selecting, from the plurality of posts, a first number of posts based on the body embedding by computing, by a contextual similarity scoring module, a contextual similarity score between a conversing post of the online forum and the query post based on the body embedding for the query post
 selecting, from the first number of posts selected based on the body embedding, a second number of posts based on the subject embedding by computing, by a fine grained similarity scoring module, a fine grained similarity score between the query post and the conversing post based on the subject embedding for the query post, wherein the second number of posts is less than the first number of posts;
 boosting, by a boosting module, the fine grained similarity score based on one or more relevance metrics by calculating a weighted sum of the one or more relevance metrics of the conversing post, wherein the one or more relevance metrics includes:
  a board relevance metric, wherein the query post and the conversing post were posted on a same board of the online forum,
  a product preference metric, wherein the query post and the conversing post reference a same product as the query post are boosted,
  an operating system relevance metric, wherein the query post and the conversing post reference a same operating system, and
  an application version metric, wherein the query post and the conversing post reference a same application version; and
 retrieving, by the web server, the conversing post in response to the query post based on the fine grained similarity score.

13. The computer-implemented method of claim 12, further comprising:
 displaying, by the web server, the conversing post to a user in response to the query post based on the contextual similarity score and the fine grained similarity score.

14. The computer-implemented method of claim 12, wherein the computing the contextual similarity score between the conversing post and the query post comprises:
- calculating, by a body encoding module, a tf-idf vector from the body of the conversing post and a tf-idf vector from the body of the query post; and
- calculating, by the contextual similarity scoring module, a similarity between the tf-idf vector from the body of the query post and the tf-idf vector from the body of the conversing post.

15. The computer-implemented method of claim 14, wherein calculating a similarity score comprises calculating a cosine similarity.

16. The computer-implemented method of claim 12, wherein calculating a similarity comprises calculating, by the fine grained similarity scoring module, an L2 distance.

\* \* \* \* \*